(12) United States Patent
Oldiges

(10) Patent No.: US 11,661,988 B2
(45) Date of Patent: May 30, 2023

(54) SYSTEM AND METHOD FOR LINE SHOCK ABSORBER OR TENSIONER

(71) Applicant: David Oldiges, Crystal River, FL (US)

(72) Inventor: David Oldiges, Crystal River, FL (US)

( * ) Notice: Subject to any disclaimer, the term of this patent is extended or adjusted under 35 U.S.C. 154(b) by 44 days.

(21) Appl. No.: 17/503,367

(22) Filed: Oct. 18, 2021

(65) Prior Publication Data
US 2023/0117767 A1 Apr. 20, 2023

(51) Int. Cl.
*F16F 1/06* (2006.01)
*B63B 21/20* (2006.01)

(52) U.S. Cl.
CPC .............. *F16F 1/065* (2013.01); *B63B 21/20* (2013.01); *F16F 2224/0208* (2013.01); *F16F 2236/06* (2013.01)

(58) Field of Classification Search
CPC ........ F16F 1/00; F16F 1/04; F16F 1/06; F16F 1/065; F16F 1/10; F16G 11/12; B66D 1/50
See application file for complete search history.

(56) References Cited

U.S. PATENT DOCUMENTS

| | | | | |
|---|---|---|---|---|
| 1,509,012 A * | 9/1924 | Whiting | ................. | F16G 11/06 114/215 |
| 2,880,992 A * | 4/1959 | Gubernick | ................ | F16F 1/06 267/74 |
| 3,817,507 A * | 6/1974 | Derman | ................... | E04H 15/32 267/74 |
| 4,192,493 A * | 3/1980 | Koughan | ............... | F16F 9/0418 267/74 |
| 5,449,151 A * | 9/1995 | Johnson | ................... | D07B 1/18 267/71 |
| 5,803,439 A * | 9/1998 | Gilmore | .................... | F16F 1/12 267/74 |
| 6,062,157 A * | 5/2000 | Derman | .................. | B63B 21/04 267/74 |
| 6,478,291 B1 * | 11/2002 | Courtney | ............... | H02G 11/00 267/136 |

* cited by examiner

*Primary Examiner* — Vishal R Sahni
(74) *Attorney, Agent, or Firm* — Christopher Mayle; Bold IP, PLLC

(57) ABSTRACT

A system and method for a line shock absorbing and/or tensioning device formed from a metal rod having a central coiled portion acting as a torsion spring with two arms extending radially from the coiled portion whereby the ends are terminated with a pigtail to allow a line to be captively held inside without the need to thread the line ends through. The line, when slackened, is manipulated inside the two pigtails and routed through a third formed pocket in the centered coiled portion to form a non-linear path. As the line is stressed, the line wants to straighten, therefore causing the V-shaped arms to flex apart and absorb the resulting shock while providing elasticity and elongation to the line itself.

19 Claims, 4 Drawing Sheets

SYSTEM AND METHOD FOR LINE SHOCK ABSORBER OR TENSIONER

FIELD OF DISCLOSURE

The overall field of this invention is a system and method for an apparatus for absorbing sudden forces and more particularly to an apparatus capable of absorbing shock loads by providing elasticity and elongation in a line connected between one or more movable objects

BACKGROUND

It is well known that a boat moored to a dock, anchor, or mooring ball is subject to constant shifting due to wind, waves, tidal action, or the wake from a passing vessel. This movement causes the mooring lines to fluctuate between a slack and taut state. These sudden shifts can impart repetitive and sometimes substantial shock loads to the mooring lines which can lead to damage or failure of the mooring lines themselves, the boat cleats, or the dock hardware. This line shock absorber/tensioner reduces the shock loads by adding elasticity to the line.

Conventional helical drawbar springs made of metal have long been used with mooring lines whereby the spring is tied between two sections of the mooring line, but these inline connections are burdensome to use and require a safety line to be ran parallel in case the spring is stretched beyond its elastic limit and ruptures. Another common complaint of drawbar springs are their "squeaking" noise which is caused by the repeated back and forth action of metal rubbing on metal.

Other types of mooring line shock absorbers have been used including the elongated rubber or resilient material type where a line is threaded through the end holes and wrapped several times around the length of the resilient bar but these tend to be susceptible to failure around the holes and are further disadvantageous in that the elongation length under high loads is comparably short and of no real help when trying to compensate for significant tidal changes. Thus exists the need for an apparatus for absorbing shock loads that may be applied at any desired location along a line already in use without the need for tying knots, having to thread the line ends through it, or having to connect additional safety lines because the line itself remains one continuous, uninterrupted element.

SUMMARY

The embodiments of the present invention are directed to a line shock absorber including: a central shoulder portion, a torsionally resilient portion, and a first arm and second arm extending outward from the torsionally resilient portion, wherein the first arm terminates into a first end portion and the second arm terminates into a second end portion wherein a flexible tension element is routable through the line shock absorber without ends of the flexible tension element needing to be positioned through the first end portion or the second end portion, whereby the central shoulder portion, the torsionally resilient portion, the first arm and the second arm are a unitary object, whereby the unitary object is made of metal, whereby the metal is coated with a corrosion resistant barrier, whereby the first end portion and the second end portion are in the form of pigtails, whereby the torsionally resilient portion is comprised of one or more helically wound coils, whereby the central shoulder portion and inner walls of the torsionally resilient portion form a retaining channel for containment of the flexible tension element, whereby a floatation device is connected to the line shock absorber, whereby the floatation device is comprised of a strap surrounded by floatable material, the strap having an attachment weavable through the one or more helically wound coils after the flexible tension element is secured in the retaining channel.

The embodiments of the present invention are also directed to a line shock absorber including a torsionally resilient portion formed from a first and second helically wound coil, a central shoulder bridging the first and the second helically wound coil, a first arm extending outward from the first coil, and a second arm extending outward from the second coil, whereby the first arm extends outward from the first coil in a first generally tangential direction and wherein the second arm extends outward from the second coil in a second generally tangential direction, whereby the first arm and the second arm are symmetrical along a longitudinal axis, whereby the first arm terminates into a first spiral pigtail and wherein the second arm terminates into a second spiral pigtail, whereby the central shoulder has a retaining channel, whereby the first and second helically wound coil are skewed from an axis such that ends of the first and second helically wound coil are positioned opposite from the central shoulder forming a gate designed to slightly spring apart, whereby the first arm and the second arm are biased inward so the first spiral pigtail and the second spiral pigtail, and a contact point on the central shoulder, are aligned in a singular general plane, whereby a floatation device is connected to the line shock absorber, whereby the floatation device is comprised of a strap surrounded by floatable material, the strap having an attachment weavable through the first and second helically wound coil.

The embodiments of the present invention are directed to a method for a line shock absorber, the method including positioning a line through the line shock absorber, the line shock absorber having a central coiled portion acting as a torsion spring with two arms extending radially from the central coiled portion, wherein the two arms terminate into pigtail to allow the line to be secured inside, and routing the line through a formed pocket in the central coiled portion to form a non-linear path through the line shock absorber, wherein when the line is stressed and the line tries to straighten, therefore causing the two arms to flex apart and absorb resulting shock while providing elasticity and elongation to the line itself, attaching a strap to the central coiled portion, the strap encompassed by a floatable material, threading the strap through a center the central coiled portion after the line has been attached to the line shock absorber to close off an entry or exit gate ensuring that the line stays inside and does not separate from the line shock absorber during violent tension swings.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
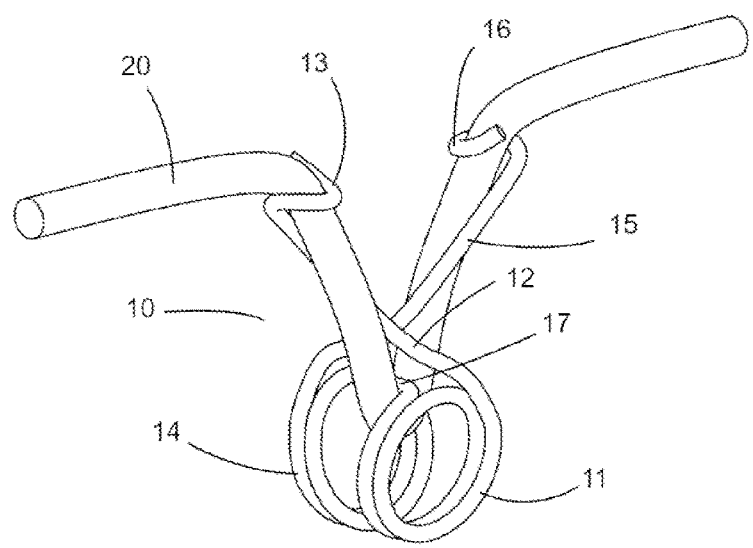
FIG. 1 is a perspective view of the embodiment with the line routed through it.

In the Summary above and in this Detailed Description, and the claims below, and in the accompanying drawings, reference is made to particular features of the invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for an improved system and method for a system and method for a device capable of absorbing shock loads by providing elasticity and elongation in a line connected between one or more movable objects. The device may be applied at any desired location along a line already in use without the need for tying knots, having to thread the line ends through it, or having to connect additional safety lines as the line itself remains one continuous, uninterrupted element. This is accomplished by a single length metal rod that is formed whereby a first and second arm extends outwardly from a central torsionally resilient portion that is terminated with a first and second end portion that are designed without needing access to the ends of the line to be "threaded" through the end portions. In this configuration the line is intended to be introduced through the first end portion, wrapped around an offset central shoulder, and further weaved into the second end portion so that the line is routed in a non-linear serpentine path. When tension is applied to the line, the resulting tensile forces pulls the first and second end portions apart, thereby rotating their respective arms and transferring a torque to the central torsion portion which acts to resist the axial force and dampen the shock loads. It is the deformation resistance and eventual straightening of the serpentine path that gives elasticity and elongation to the line which absorbs the shock loads. When the tensile force becomes so great, the two end portions eventually become aligned with the central shoulder and the line itself becomes essentially straight at which point any additional forces are taken solely by the line.

One non-limiting embodiment of line shock absorber 10 in accordance with the present invention is illustrated in FIG. 1. In this embodiment, line shock absorber 10 may be formed from a single length rod with a round cross-section, however this is non-limiting and the cross section may instead be an elliptical, hexagonal, square, or rectangular cross section bar stock may be used. Line shock absorber 10 may be made to be UV and corrosion resistance formed from a corrosion resistant steel and/or encasing the metal in a plastic or rubber material either before or after although alternative materials and/or elements may also be used such as aluminum, copper, titanium, brass, magnesium, fiberglass, gold, silver, graphite, plastic, carbon fiber, wood, polymers, and other composites.

Line shock absorber 10 includes a torsionally resilient portion which in this embodiment is formed from a first and second helically wound coil 11 and 14, unitarily bridged together by a central shoulder 17, whereby a first arm 12 may extend outward in a first general tangential direction from first coil 11 terminating into a first end portion 13. A second arm 15 may extend outward in a second general tangential direction from second coil 14 terminating into a second end portion 16 that is symmetrical to the first tangential direction along a longitudinal axis. First end portion 13 and second end portion 16 may be formed into spiral pigtails which allow for the easy insertion, retention, and subsequent removal of a line 20 without needing to thread the ends of line 20 through. End portions 13 and 16 may be integral to the original material being formed or may be attached via a variety of methods or fasteners such as latches, hinges, adhesive, or other methods known by those of ordinary skill in the art and furthermore may be formed into a variety of shapes that can contain the line not limited to a spiral pigtail as shown.

Figure 2:
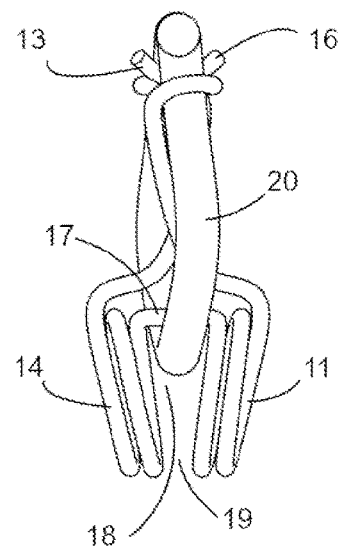
FIG. 2 is a front view of the embodiment with the line routed through it.
Figure 3:
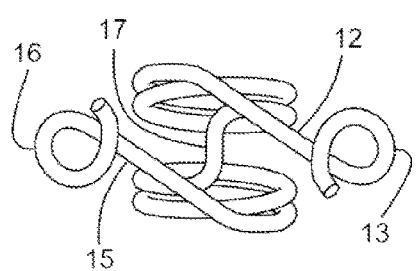
FIG. 3 is a top view of the embodiment without the line routed through it.

In this embodiment, central shoulder 17 may be dimensioned and formed to create a retaining channel 18 wide enough to allow a line 20 of varying diameters to be contained inside it as illustrated in FIG. 2. Coils 11 and 14 may skewed from their axis so that the ends of coils 11 and 14 may be positioned opposite from central shoulder 17 form an entry/exit gate 19 designed to slightly spring apart as line 20 is snapped through it and retained inside retaining channel 18. In this embodiment, first arm 12 and second arm 15 may be biased inward to first end portion 13 and second end portion 16 as well as the contact point on central shoulder 17, are aligned in the same general plane as illustrated in FIG. 3.

Figure 4A:
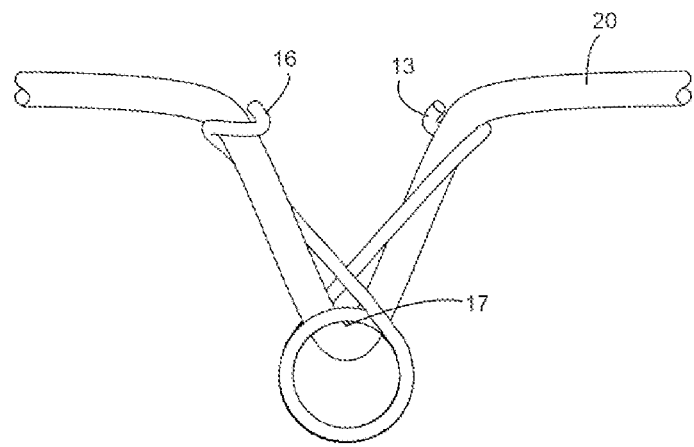
FIG. 4A is a side view of a preferred embodiment with a line running through it in an un-tensioned state.
Figure 4B:
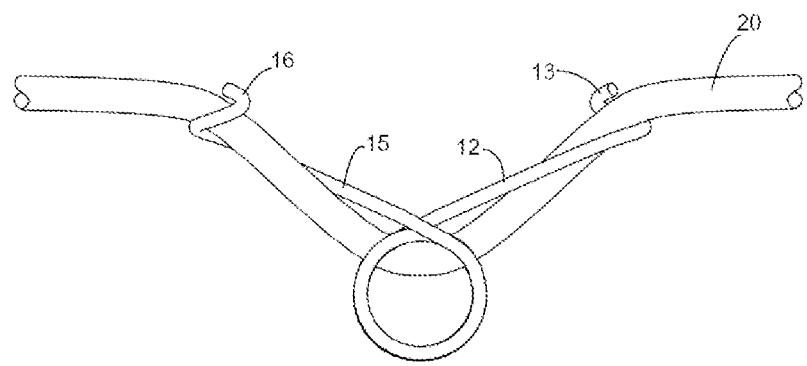
FIG. 4B is a side view of a preferred embodiment in an intermediate position with a line running through it having a medium axial tensile load.

When line 20 is routed through line shock absorber 10 and an a tensile force is applied, the forces that are subsequently transferred to the three contact points do not twist the line shock absorber 10 about an undesired axis. In this embodiment, when line 20 is routed through first end portion 13 and second end portion 16 and around central shoulder 17, it will form essentially a non-linear V-shape pattern as shown in FIG. 4A. When a tensile force is induced on line 20, as shown in FIG. 4B, first end portion 13 and second end portion 16 begin to move outward causing first arm 12 and second arm 15 to rotate apart which induces a torque into coil 11 and 14 where most of the shock energy is transferred to and absorbed. This torque directionally wants to close both coil 11 and 14 as they are wound in the opposite direction from each other and first end portion 13 and second end portion 16 cross the center-line from where they begin to extend from coil 11 and 14.

Figure 4C:
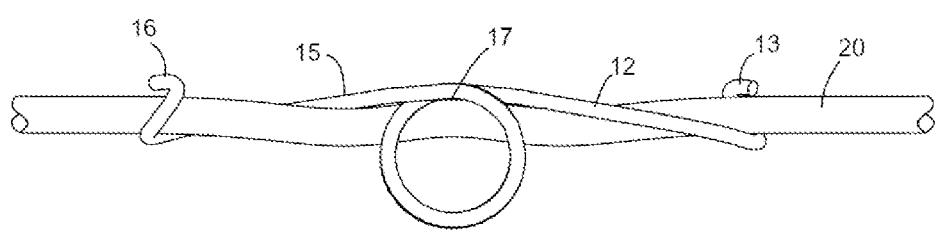
FIG. 4C is a side view of a preferred embodiment in a fully open position with a line running through it having a high axial tensile load.

If further tensile forces are then applied, line 20 wants to essentially straighten itself until first end portion 13 and second end portion 16 and central shoulder 17 are in alignment as illustrated in FIG. 4C. Any additional forces added after the device is in its fully flexed state are absorbed entirely by line 20 itself. The primary performance characteristics of line shock absorber 10 are stiffness and elongation which may be modified to suit any desired requirement, by varying the dimensions and/or materials used. The potential elongation depends on the length of first arm 12 and second arm 15 and the angle between them that form the V-shape when there is no tensile load present. In other words, the effective elongation of line 20 may be defined by the linear difference in space between first end portion 13 and second end portion 16 when line 20 first becomes strained (full V shape) as illustrated in FIG. 4A and when the line 20 becomes taut or straight as illustrated in FIG. 4C.

The stiffness of line shock absorber 10, or the amount of force applied before line 20 straightens and first end portion 13 and second end portion 16 are in line with central shoulder 17, is primarily dependent upon the material properties, rod diameter, number of coil windings, and the helical diameter of coils 11 and 14.

Figure 5:
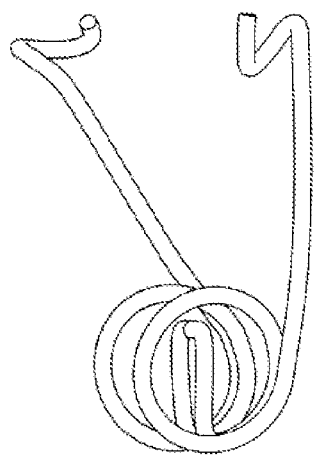
FIG. 5 is a perspective view of an alternate embodiment with the coils coming out of the central shoulder wound in the same direction.

In one or more alternate non-limiting embodiments as illustrated in FIG. 5, the first and second coils 11 and 14 are wound in the same direction as they emanate from central shoulder 17 such that when a tensile load is applied to line 20, first arm 12 and second arm 15 rotate apart which imparts a torque in the coils 11 and 14 that directionally opens one of the coils and closes the other.

Figure 6:
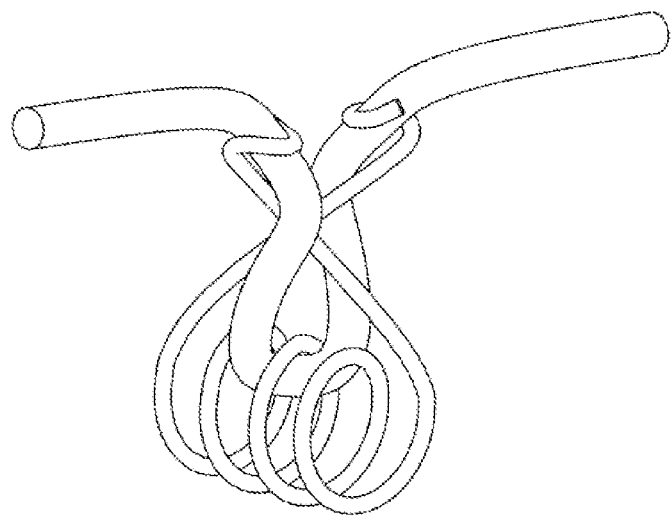
FIG. 6 is a perspective view of an alternate embodiment with the widely spaced coils.
Figure 7:
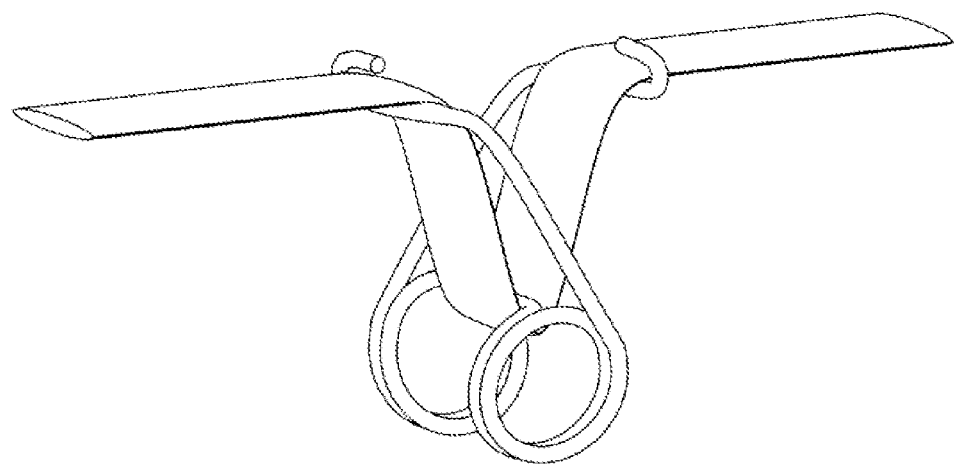
FIG. 7 is a perspective view of an alternate embodiment formed to accept a thin wide strap instead of line.

In another non-limiting embodiment, central shoulder 17 may simply be a gap between coils if the coils themselves are wound loosely enough as illustrated in FIG. 6. In a further alternate embodiment, first end portion 13 and second end portion 16 may be formed in such a way to accept and contain a wide strap as illustrated in FIG. 7. When line shock absorber 10 is used in and around the water, it is preferred to make it floatable, for example, a strap encompassed by a floatable material may be attached to coils 11 and 14 and further be threaded through the center of both coils 11 and 14 after line 20 has been attached to essentially close off entry/exit gate 19 ensuring that line 20 stays inside channel 18 and doesn't separate from line shock absorber 10 during violent tension swings. The floatable material is designed to keep the device afloat in case it is dropped into water during the loading or unloading sequence. In further embodiments line shock absorber 10 may be connected to a carabiner or another apparatus to fasten line shock absorber 10 to other objects.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. A line shock absorber comprising:
    a central shoulder portion bridging a first coil and a second coil, the first coil and the second coil having a torsional resilience about a first torsional axis and a second torsional axis, the first torsional axis and the second torsional axis being substantially parallel to each other;
    a first arm comprising an extension extending outwardly from the first coil in a substantially radial direction from the first torsional axis terminating with a first end portion, wherein the first end portion is configured to receive and retain a first section of a flexible tension element; and
    a second arm comprising an extension extending outwardly from the second coil in a substantially radial direction from the second torsional axis terminating with a second end portion, wherein the second end portion is configured to receive and retain a second section of the flexible tension element.

2. The line shock absorber of claim 1: wherein the central shoulder portion, the first coil and the second coil, the first arm and the second arm, and the first end portion and the second end portion are a unitary object made of a substantially uniform piece of material.

3. The line shock absorber of claim 2: wherein the unitary object is made of metal.

4. The line shock absorber of claim 2: wherein the unitary object has a round cross-section.

5. The line shock absorber of claim 1: wherein the first end portion and the second end portion are in a form of a first pigtail and second pigtail spiraling outward from a remainder of the first arm and the second arm.

6. The line shock absorber of claim 1: wherein the first coil and the second coil are comprised of at least a partial helical wind up to a plurality of helical windings.

7. The line shock absorber of claim 1: wherein a surface of the first coil and the second coil form a retaining channel with a surface of the central shoulder portion, wherein the retaining channel is configured to receive and retain a third section of the flexible tension element.

8. The line shock absorber of claim 7: wherein a distal radius of the first coil and the second coil extending from the central shoulder portion are skewed toward each other forming a gate adapted to spring apart and allow side entry of the flexible tension element into the retaining channel.

9. The line shock absorber of claim 1: wherein the first arm and the second arm are skewed inwardly along the first torsional axis and the second torsional axis, wherein the first end portion, the second end portion, and the central shoulder portion are disposed in a V-shaped orientation on a same general plane that is substantially perpendicular to a first coil axis and a second coil axis and substantially central to the first coil and the second coil.

10. A line shock absorber system to introduce resilience into a flexible tension element when the flexible tension element is tensioned comprising:
    a central shoulder portion extending to a first coil and a second coil, the first coil and the second coil having a torsional resilience about a first torsional axis and second torsional axis, the first torsional axis and the second torsional axis being substantially parallel to each other,
    a first arm comprising an extension extending outwardly from the first coil in a substantially radial direction from the first torsional axis terminating with a first end portion, wherein the first end portion is configured to receive and retain a first section of said flexible tension element, wherein the first arm and the first end portion are configured to resiliently rotate about the first torsional axis conveying a torsional load to the first coil when tension is applied to the flexible tension element contained there within; and a second arm comprising an extension extending outwardly from the second coil in a substantially radial direction from the second torsional axis terminating with a second end portion, wherein the second end portion is configured to receive and retain a second section of the flexible tension element, wherein the second arm and the second end portion are configured to resiliently rotate about the second torsional axis conveying the torsional load to the second coil when the tension is applied to the flexible tension element contained there within, wherein the first end portion and the second end portion are disposed in a V-shaped orientation with the central shoulder portion.

11. The line shock absorber system of claim 10: wherein the central shoulder portion, the first coil and the second coil, the first arm and the second arm, and the first end portion and the second end portion are a unitary object made of a substantially uniform piece of steel.

12. The line shock absorber system of claim 11: wherein the unitary object has a round cross-section.

13. The line shock absorber system of claim 10: wherein the first end portion and the second end portion are in a form of a first pigtail and a second pigtail spiraling outward from a remainder of the first arm and the second arm.

14. The line shock absorber system of claim 10: wherein a surface of the first coil and the second coil form a retaining channel with a surface of the central shoulder portion, wherein the retaining channel is configured to receive and retain a third section of the flexible tension element.

15. The line shock absorber system of claim 14: wherein a distal radius of the first coil and the second coil extending from the central shoulder portion are skewed toward each other forming a gate adapted to spring apart allowing receipt of the flexible tension element into the retaining channel.

16. The line shock absorber system of claim 13: wherein the first arm and the second arm are skewed inwardly along the first torsional axis and the second torsional axis so the first pigtail and the second pigtail, and a contact point on the central shoulder portion are disposed in the V-shaped orientation on a same general plane that is substantially perpendicular to a first coil axis and a second coil axis and substantially central to the first coil and the second coil.

17. The line shock absorber system of claim 10: wherein the first arm and the second arm are configured to rotate in opposite directions in substantially a same plane twisting the first coil and the second coil tighter in a closing direction.

18. The line shock absorber system of claim 10: wherein the first coil and the second coil are formed from a helically wound shape.

19. A method for a line shock absorber system, the method comprising:

positioning a flexible tension element through a line shock absorber, the line shock absorber having a torsionally resilient portion about a torsional axis with a first arm and second arm extending outwardly from the torsionally resilient portion in a substantially radial direction from a torsional axis, wherein the first arm and second arm arms terminate into a first end portion and a second end portion, wherein the first end portion and the second end portion are configured to each allow receipt and retention of a section of the flexible tension element; and routing the flexible tension element around a central shoulder portion and through the first end portion and the second end portion to form a non-linear V-shaped path in a first configuration when the flexible tension element in not under stress, wherein when enough tension is applied to the flexible tension element, the first end portion and the second end portion resiliently rotate from the first configuration to a second configuration wherein the first end portion and the second end portion are substantially aligned with the central shoulder portion and a resulting shock is absorbed by the torsionally resilient portion while providing elasticity and elongation to the flexible tension element.

\* \* \* \* \*